(12) United States Patent
Gejima et al.

(10) Patent No.: US 7,695,824 B2
(45) Date of Patent: Apr. 13, 2010

(54) REINFORCED MEMBER

(75) Inventors: Fumihiko Gejima, Yokohama (JP); Hiroshi Sakurai, Kanagawa (JP); Masaki Kuno, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 533 days.

(21) Appl. No.: 10/931,256

(22) Filed: Sep. 1, 2004

(65) Prior Publication Data
US 2005/0087271 A1    Apr. 28, 2005

(30) Foreign Application Priority Data
Sep. 4, 2003    (JP)    ............... 2003-313106

(51) Int. Cl.
*B21D 41/00*    (2006.01)
*C21D 8/10*    (2006.01)

(52) U.S. Cl. .................. 428/586; 428/577; 428/684; 72/61; 72/367.1; 72/370.22; 148/624; 148/579; 29/897; 29/897.2

(58) Field of Classification Search .................. None
See application file for complete search history.

(56) References Cited

U.S. PATENT DOCUMENTS

| | | | | |
|---|---|---|---|---|
| 5,220,717 A * | 6/1993 | Matsuoka et al. | ............. | 29/422 |
| 5,802,903 A * | 9/1998 | Nakajima | ............. | 72/224 |
| 5,895,534 A | 4/1999 | Daley et al. | | |
| 6,105,409 A * | 8/2000 | Kojima et al. | ............. | 72/58 |
| 6,289,710 B1 * | 9/2001 | Ozeki | ............. | 72/370.04 |
| 6,322,645 B1 * | 11/2001 | Dykstra et al. | ............. | 148/520 |
| 6,510,720 B1 * | 1/2003 | Newman et al. | ............. | 72/61 |
| 6,692,584 B2 | 2/2004 | Sakata et al. | | |
| 6,752,451 B2 * | 6/2004 | Sakamoto et al. | ............. | 296/187.03 |
| 6,866,725 B2 * | 3/2005 | Fujita et al. | ............. | 148/320 |
| 7,005,016 B2 * | 2/2006 | Turi et al. | ............. | 148/540 |
| 2004/0238081 A1 * | 12/2004 | Yoshinaga et al. | ............. | 148/603 |
| 2005/0217417 A1 * | 10/2005 | Uchida et al. | ............. | 74/594.1 |

FOREIGN PATENT DOCUMENTS

| | | |
|---|---|---|
| CN | 1151765 A | 6/1997 |
| DE | 195 18 252 A1 | 11/1996 |
| EP | 0 620 056 A1 | 10/1994 |

(Continued)

OTHER PUBLICATIONS

JP 2001-303196 Enlgish Machine Translation, Tosaka et al, Oct. 2001.*

(Continued)

*Primary Examiner*—Jennifer McNeil
*Assistant Examiner*—Jason L Savage
(74) *Attorney, Agent, or Firm*—Foley & Lardner LLP

(57) ABSTRACT

A reinforced member which is made from a steel product having a strain aging characteristic and has a closed section at a cross section perpendicular to an axis of the reinforced member. The reinforced member includes a reinforced area which is produced by press-forming the steel product so as to generate a compression strain in the press-formed steel product due to the application of a compression stress to the steel product along the direction from a surface of the steel product to an inside of the steel product, and by giving a strain aging treatment to the press-formed member.

15 Claims, 8 Drawing Sheets

FOREIGN PATENT DOCUMENTS

| | | |
|---|---|---|
| EP | 1 207 213 A1 | 5/2002 |
| JP | 10-138950 A | 5/1998 |
| JP | 2000-178684 A | 6/2000 |
| JP | 2001-303185 A | 10/2001 |
| JP | 2001-335889 A | 12/2001 |
| JP | 2002-35855 A | 2/2002 |
| JP | 2002-235147 A | 8/2002 |
| JP | 2002-273527 A | 9/2002 |
| JP | 2004-204315 A | 7/2004 |

OTHER PUBLICATIONS

DE 19518252 English Machine Translation, Scaefer, Production of metallic hollow body using high internal pressure, Nov. 1996.*

A. Uenishi et al., "Material Characterization at High Strain Rates for Optimizing Car Body Structures for Crash Events", Nippon Steel Technical Report, No. 88, Jul. 2003, pp. 22-26.

\* cited by examiner

REINFORCED MEMBER

BACKGROUND OF THE INVENTION

The present invention relates to a reinforced member which is made from a steel product having a strain aging characteristic and has a closed section in the direction perpendicular to the axis of the reinforced member, and more particularly to a reinforced member constructing a vehicle structural member such as a member and a roof rail.

There have been proposed various steel products having a strain aging characteristic, in order to ensure a desired strength of structural members while decreasing a vehicle weight by decreasing a thickness of a steel product. For example, Japanese Published Patent Application Nos. 2001-303185 (≈U.S. Pat. No. 6,692,584) and 2001-335889 disclose typical steel sheets having a strain aging characteristic.

SUMMARY OF THE INVENTION

Press forming products are in general used as structural members of automotive vehicles. Press forming has become in wide use and highly established as a production method including high techniques. In press forming process, there is a tendency that the ductility of the material decreases as the strength of the material increases. Therefore, it is necessary to suppress the tension applied to the material in order to prevent the generation of cracking during the press forming process. As a result, there is a problem that it is difficult to apply strains for effectively generating age-hardening due to the strain aging to the material.

A lot of press forming products for automotive structural members are straight in shape. When a straight shaped part is press formed, deformations of the material in a die cavity are mainly tensile deformations. Therefore, it is difficult to apply a compression strain to the material of the straight part during the press forming process. Accordingly, there has not been proposed any effective use of a strength property which is generated by compressingly press-forming a steel sheet having a strain aging property.

On the other hand, there have been heavily proposed features as to a steel sheet having a strain aging characteristic as discussed above. However, there has been no proposal utilizing a compression strain effect in strength of strain-aging treated steel.

It is therefore an object of the present invention to provide a high-strength performing reinforced member which is obtained by utilizing a strength characteristic obtained by compressingly deforming a steel product having a train aging characteristic.

Inventors of the present invention found through intensive researches that when a stain generated by a compression stress in a plate was applied to a member, an increase quantity of the strength due to the strain aging of the thus treated member became large as compared with a member to which a strain due to one axis tensile stress is applied, wherein the increase quantity of the strength denotes an increase quantity of a tensile strength measured by a static tensile test.

Further, the inventors found that even in a case of a dynamic tensile strength, an increase quantity of the dynamic tensile strength due to the strain aging of the thus treated member also became large as compared with a member to which a strain due to one axis tensile stress is applied. Furthermore, by forming a member so as to increase a thickness of the member by applying compressing stresses in a plate of the member, it becomes possible to increase a deformation load with increase of the thickness of the member in addition to the increase of the material strength. Therefore, it became possible to largely improve static and dynamic bending loads of the member.

Although kinds, components and production methods of steel products have not been specifically limited, the inventors of the present invention have found that the strength increase in a pre-strain range defined in the present invention increases as the strength increase of a member, which received a baking process after one-axis tensile pre-strain was applied to the member increases. Therefore, it is preferable that an increase quantity of 0.2% is 30 Mpa or more, when one-axis tensile pre-strain 2% is applied to the member and a baking process of 170° C.×20 min.

An aspect of the present invention resides in a reinforced member which is made from a steel product having a strain aging characteristic and has a closed section at a cross section perpendicular to an axis of the reinforced member. The reinforced member comprises a reinforced area produced by press-forming the steel product so as to generate a compression strain in the press-formed steel product due to the application of a compression stress to the steel product along the direction from a surface of the steel product to an inside of the steel product, and by giving a strain aging treatment to the press-formed member.

Another aspect of the present invention resides in a method of producing a reinforced member made from a steel product having a strain aging characteristic and has a closed section at a cross section perpendicular to an axis of the reinforced member. The method comprises an operation of press-forming the steel product so as to generate a compression strain in the press-formed steel product due to the application of a compression stress to the steel product along the direction from a surface of the steel product to an inside of the steel product, and an operation of giving a strain aging treatment to the press-formed member.

The other objects and features of this invention will become understood from the following description with reference to the accompanying drawings.

DETAILED DESCRIPTION OF THE INVENTION

Figure 1A:
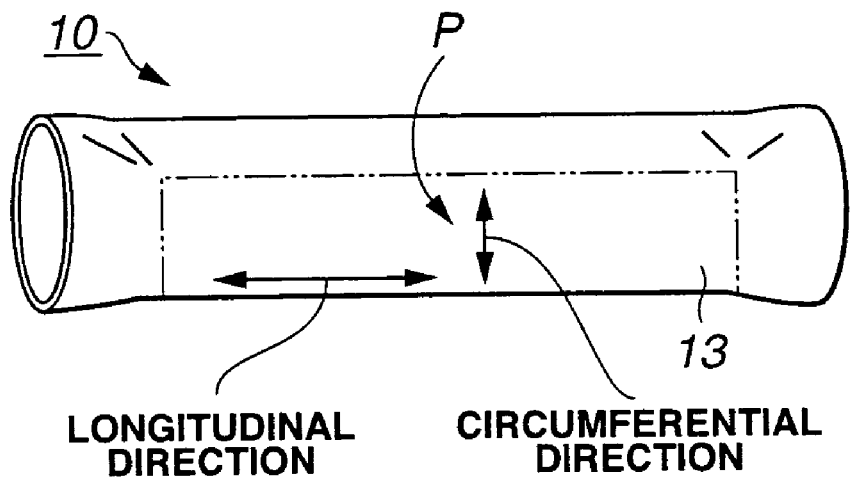
FIG. 1A is a perspective view showing a first embodiment of a reinforced member according to the present invention.

Referring to the drawings, there are discussed embodiments of a reinforced member according to the present invention.

Figure 1B:
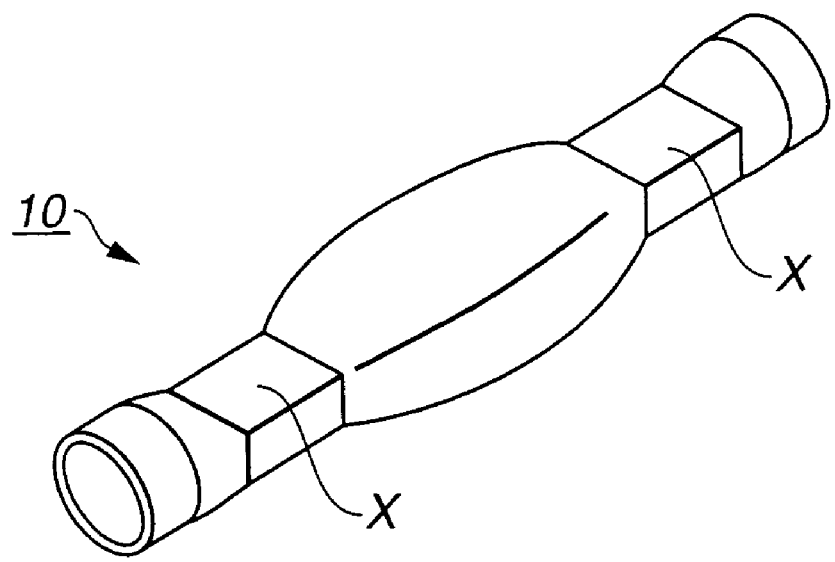
FIG. 1B is a perspective view showing a modified reinforced member in which high-load receiving portions are formed into reinforced areas X.
Figure 2A:
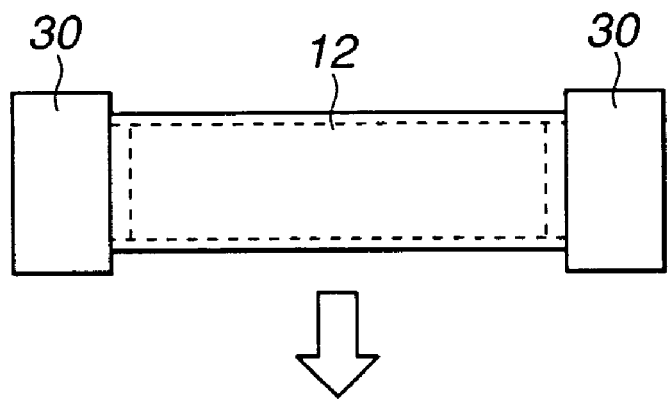
FIGS. 2A, 2B and 2C are explanatory views sequentially showing manufacturing procedures of the reinforced member of FIG. 1A.
Figure 2B:
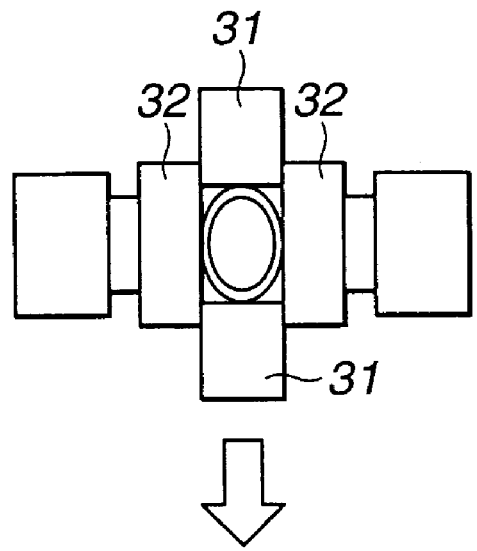
Figure 2C:
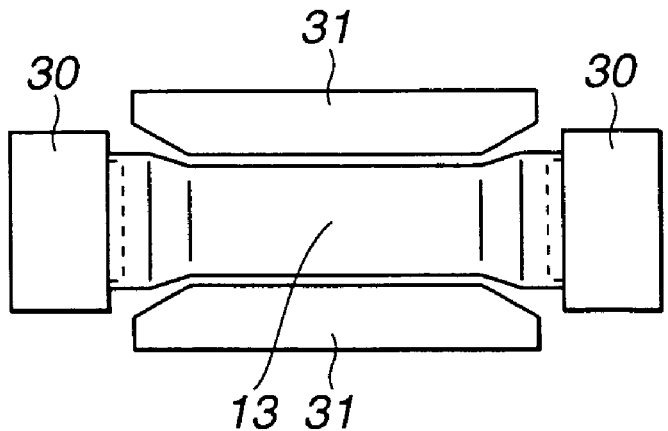
Figure 3A:
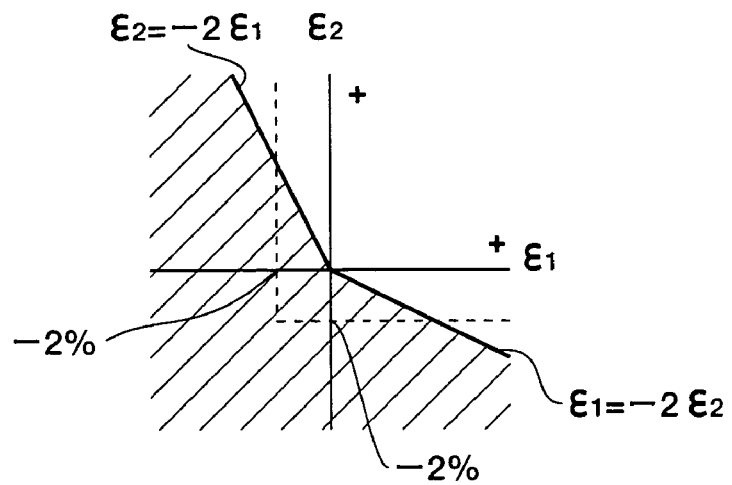
FIGS. 3A and 3B are graphs explaining allowable ranges of two principal strains generated in a sheet of the reinforced member.
Figure 3B:
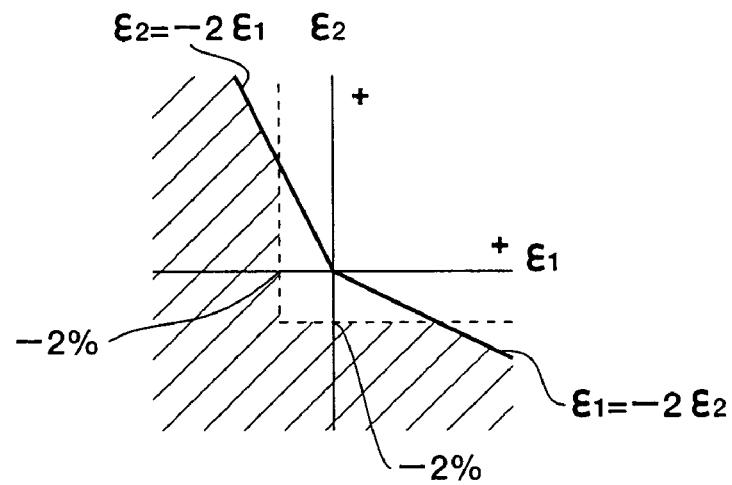

FIG. 1A shows a first embodiment of a reinforced member 10 according to the present invention. FIG. 1B shows a modified reinforced member 10 in which high-load receiving portions are formed into reinforced areas X. FIGS. 2A, 2B and 2C are explanatory views sequentially showing manufacturing procedures of the reinforced member of FIG. 1A. FIGS. 3A and 3B are graphs explaining allowable ranges of two principal strains generated in a sheet for the reinforced member.

Reinforced member 10 according to the present invention is made from a steel sheet having a strain aging characteristic and has a closed section at a cross section perpendicular to an axis of reinforced member 10. At least a part of a surface of reinforced member 10 is formed into a reinforced area P. More specifically, the reinforced area P is press-formed to generate a compression strain in the formed steel sheet by applying compression stress to the steel sheet along the direction from a surface to an inside of the member 10. Thereafter, a strain aging treatment is given to the press-formed member. The reinforced area P is an area surrounded by a two-dot chain line in FIG. 1A. The closed section of reinforced member 10 is formed by butt welding a hot-rolled steel sheet formed into a cylindrical shape or by employing a steel pipe or cylindrical steel member.

It is preferable that a compression strain generated in the steel surface by applying compression stress satisfies one of the following conditions (A), (B) and (C).

(A) Compression strain is applied to two principal strains in the sheet, and at least one of them is a compression strain of 2% or more, due to the compression stress.

(B) Compression strain of 2% or more due to the compression stress is applied to one of the two principal strains in the sheet, and the other principal strain receives elongation strain smaller than twice the principal strain receiving the compression strain.

(C) compression strain of 2% or more is applied to one of two principal strain in the sheet, and the other principal strain is zero.

Since the inventors of the present invention have found through various experiments and researches that when the compression strain in the sheet is generated by one of the above discussed strain routes, the increase quantities of the static and dynamic strength of the structural member after the strain aging treatment becomes particularly large.

Referring to FIG. 3A, there is discussed the reason for limiting the ranges of the two principal strains in the sheet.

Principal strains are strains along the respective axial directions in case that axes of coordinates are determined so as to cancel the share strain components. Accordingly, three principal strains exist in the coordinates. The unit of the principal strain is no dimension. In the present invention, the tree principal strains are constructed by a strain applied along the sheet-thickness direction, and two strains applied in the sheet. The principal strains generated in the sheet are generally a strain along the longitudinal direction of the closed section member and a strain along the circumferential direction of the closed section member. In case of one-axis tensile, the principal strains in the sheet are defined as $\epsilon_1$ and $\epsilon_2$. More specifically, $\epsilon_1$ denotes a strain applied along the stretch direction, and $\epsilon_2$ denotes a strain applied along the direction perpendicular to the stretch direction. The stretch direction is denoted by plus (+), and the compression direction is denoted by minus (−). Generally, the relationship therebetween is expressed by the equation of $\epsilon_1:\epsilon_2=2:-1$. This equation represents that $\epsilon_2$ is a compression strain having a magnitude half that of $\epsilon_1$.

In contrast to this, the present invention is specifically characterized by generating the compression strain in the sheet by applying the compression stress. In FIG. 3A, the compression strain in the sheet is applied by the compression stress in the area shown by hatching wherein a point on the boundary of the area does not receive the compression strain.

The inventors of the present invention has found a fact that the increase quantity of the strength becomes particularly large by giving the strain aging treatment to the member after a pre-strain is applied to the member along the compression direction.

The reason for defining the absolute value of the compression strain to be 2% or more is as follows.

When the strain is less than 2%, the degree of work hardening is small, and therefore the absolute increase quantity of the strength after the strain aging treatment was given is also small. Accordingly, when the strain is less than 2%, it is difficult to apparently find the superiority that the increase of the strength is generated by applying the compression strain through applying the compression stress. Further, in case that the strength is increased by applying the compression strain as a pre-strain by means of the compression stress, it is possible to decrease the weight of the member by decreasing the thickness of the employed steel sheet when maintaining the strength of the vehicle body. However, the inventors of the present invention have found through various experiments and analyses that decreasing the thickness of the steel sheet by one gage requires the work hardening of 2% or more by applying the compression stress. Therefore, the inventors of the present invention have defined that the quantity of the principal strain should be set to be more than 2%.

Consequently, the range satisfying the above discussed conditions (A), (B) and (C) correspond to the range shown by hatching in FIG. 3B.

Although the closed section including the reinforced area P is formed into a rectangular shape, it is not limited to this and may be formed into a circular shape.

The principal strain has been generated by the compression stress applied to the member so as to decrease the circumferential length of the closed section.

It is preferable that the reinforced area P includes a part which receives the high-stress load. The part receiving the high-stress load is, for example, a part where the circumferential length of the closed section is shorter than that at the other part. In reinforced member 10 shown in FIG. 1B, a part denoted by character X is a part receiving the high-stress load, and is therefore the part having a shape generating the stress concentration.

More specifically, reinforced member 10 is formed using a steel pipe or cylindrical steel sheet, and reinforced member 10 is shaped such that a circumferential length of a cross section perpendicular to the longitudinal direction of reinforced member 10 is varied and that at least a part, wherein the circumferential length of the cross section is smaller than that of the other part, is set as a reinforced area P.

In case that a member having a shape, which changes the circumferential length of the cross section along the longitudinal direction, is employed as a vehicle structural member, the part having a short circumferential length is a part which receives a high stress load in case of a vehicle collision and is therefore the most deformable part in the vehicle collision. In other words, the part having a short circumferential length will degrade the vehicle rigidity if no reinforcing treatment is given to the part.

According to the present invention, the part having the short circumferential length is, therefore, improved in strength by applying the compression strain treatment and the strain aging treatment to the part. Therefore, the stress concentration thereto is softened, and the rigidity of the reinforced member according to the present invention is improved. The compression strain to the reinforced member may be applied by means of hydro-forming, spinning, swaging or rolling.

In case that the closed section of the reinforced member has a rectangular shape as shown in FIG. 1A, it is preferable that the compression strain is applied to the whole area of at least two faces of the plurality of side faces by means of hydro-forming.

A temperature condition of the strain aging treatment has a range from 140° C. to 170° C., which corresponds to the temperature during a paint baking process. When this temperature condition is satisfied, the reinforced member has a sufficient characteristic due to the strain aging hardening.

The thus arranged reinforced member 10 according to the present invention is applicable to various structural members. For example, this reinforced member is applicable to a vehicle structural member, and more specifically to various members, roof rails, various pillars, and sills. Further, it will be understood that the reinforced member is applicable to the other vehicle structural member such as a door guard cover.

As shown in FIGS. 2A, 2B and 2C, reinforced member 10 shown in FIG. 1A is formed by hydro-forming. First both openings of steel pipe 12 having a strain aging characteristic are closed by hydro-forming nozzles 30. Then pressurized hydraulic is supplied into steel pipe 12 through hydro-forming nozzles 30 as shown in FIG. 2A. Simultaneously with the application of hydraulic pressure in steel pipe 12, both ends of steel pipe 12 are fixed in the longitudinal direction, and front and rear side of steel pipe 12 are pushed by side dies 32 from the fore-and-aft directions perpendicular to the longitudinal direction, as shown in FIG. 2B. Thereafter, the upper and lower sides of steel pipe 12 are pushed by hydro-forming punches 31 as shown in FIGS. 2B and 2C. During this pressing by means of hydro-forming punches 32, longitudinal wall faces 13 receive both of the compression stress directed in the longitudinal direction in the sheet and the compression stress directed in the circumferential direction in the sheet, and therefore, the member 10 receives the compression strain toward the longitudinal direction. Thereafter, the strain aging treatment of the temperature condition ranging from 140° C. to 170° C. is given to the thus formed. By this arrangement, reinforced member 10 having a reinforced area P at the longitudinal faces 13 is produced.

Figure 4:
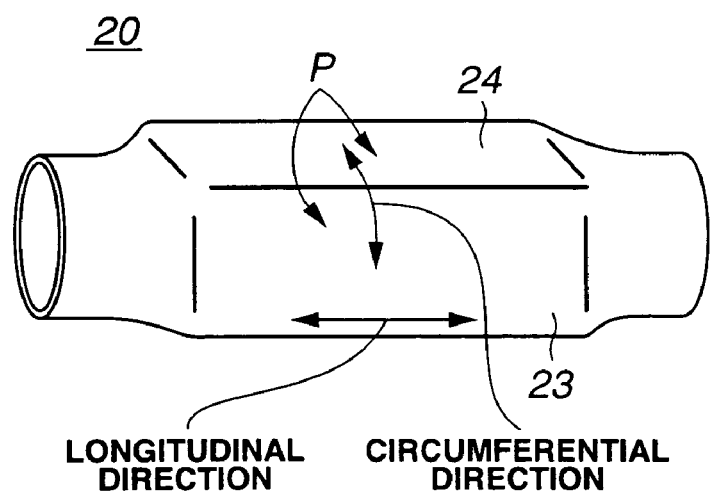
FIG. 4 is a perspective view showing a second embodiment of the reinforced member according to the present invention.
Figure 5A:
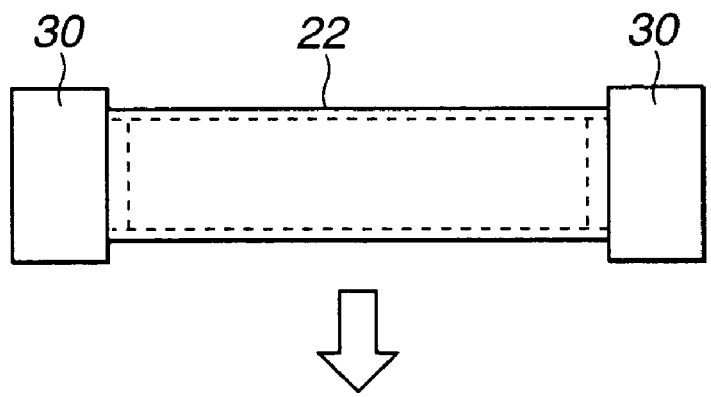
FIGS. 5A, 5B and 5C are explanatory views sequentially showing manufacturing procedures of the reinforced member of FIG. 4.
Figure 5B:
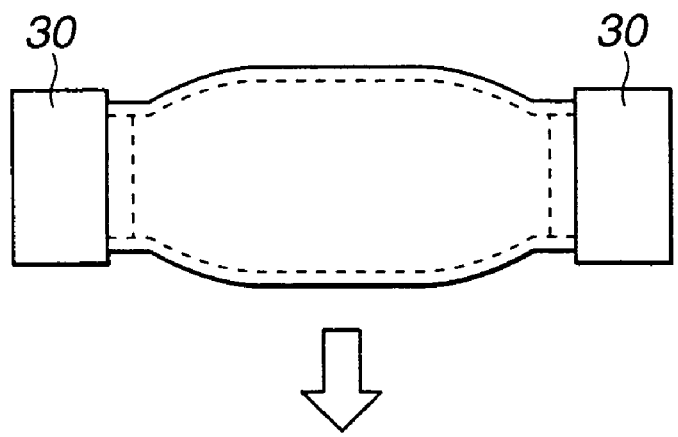
Figure 5C:
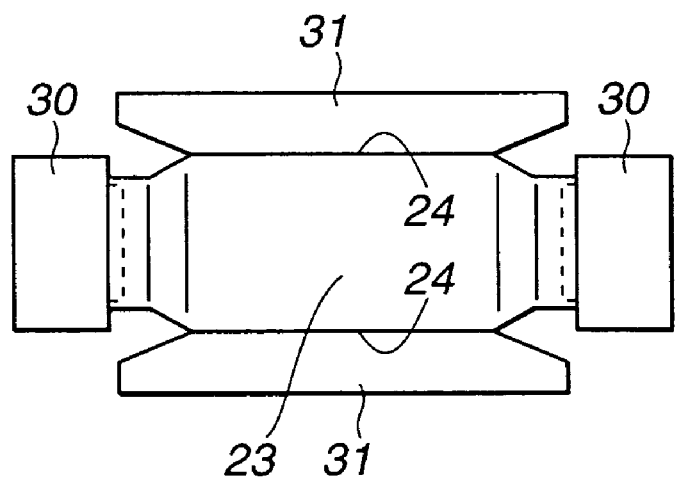

FIG. 4 shows a reinforced member 20 of a second embodiment according to the present invention. FIGS. 5A, 5B and 5C show manufacturing procedures of reinforced member 20 of FIG. 4.

Both of the tensile pre-stress along the circumferential direction and the compression stress along the longitudinal direction are applied to reinforced member 20. As shown in FIG. 4, reinforced member 20 of the second embodiment comprises longitudinal wall faces 23 and punch contacting faces 24.

As shown in FIGS. 5A, 5B and 5C, reinforced member 20 is formed by means of hydro-forming. First both openings of a steel pipe 22 having a strain aging characteristic are closed by hydro-forming nozzles 30. Then pressurized hydraulic is supplied into steel pipe 12 through hydro-forming nozzles 30 as shown in FIG. 5A. By the application of hydraulic pressure in steel pipe 22, steel pipe 22 is expanded, and simultaneously the steel pipe 22 is compressed in the longitudinal direction by the compressing motion of nozzles 30, as shown in FIG. 5B. Further, four side faces of the expanded steel pipe are compressed to generate the compressing strain directed to the longitudinal direction and the tensile strain directed to the circumferential direction. Thereafter, the strain aging treatment of the temperature condition ranging from 140° C. to 170° C. is given to the formed member (reinforced member 20). By this arrangement, reinforced member 20 having a reinforced area P at the longitudinal faces 23 and punch contacting faces 24 is produced.

Hereinafter, there is discussed the present invention with reference to Examples of the reinforced member according to the present invention. The scope of the present invention is not limited to the following explanation.

A hot roll steel sheet having a thickness of 1.8 mm, which is a typical steel sheet having the strain aging characteristic, was formed into a tubular shape, and the rolled ends of the sheet was connected by means of butt welding, to form a pipe member.

The pipe member was deformed by means of hydro-forming such that a cross section perpendicular to the axial direction of the pipe member kept a closed section. By variously changing the forming condition such as a hydraulic pressure, various EXAMPLES respectively having various strains were obtained as shown in TABLE 1. In TABLE 1, there is shown a ratio between two principal strains (circumferential pre-strain and longitudinal pre-strain) in the sheet of each hydro-forming member. When the value in the ratio is a positive value, the strain is directed to the stretching direction. When the value in the ratio is a negative value, the strain is directed to the compressing direction.

TABLE 1

| | Ratio of two principal strains in plate (circumferential pre-strain: longitudinal pre-strain) |
|---|---|
| Example 1 | −1:0 |
| Example 2 | 4:−3 |
| Comparative Example | 2:−1 |

Remarks: positive value denotes a tensile direction, negative value denotes a compressing direction.

As EXAMPLE 1, reinforced member 10 shown in FIG. 1A was obtained. The compression stress in the circumferential direction in the sheet was applied to reinforced member 10 of EXAMPLE 1 during the production process. By this compression stress, compression strain along the circumferential direction was applied to the longitudinal wall faces of reinforced member 10.

As EXAMPLE 2, reinforced member 20 shown in FIG. 4 was obtained. Both of the compression stress directed in the circumferential direction and the tensile stress directed in the circumferential direction in the sheet were applied to reinforced member 20 during the production process. By these compression stress and tensile stress, a compression strain along the longitudinal direction and a tensile strain along the circumferential direction were applied to the longitudinal wall faces of reinforced member 20.

As COMPARATIVE EXAMPLE, a member shown in FIG. 4 was obtained as is similar to EXAMPLE 2. Although in EXAMPLE 2 a compression strain due to a compression stress was applied to the member by pressing nozzles 30 against the member in the longitudinal direction during the forming process, the member of COMPARATIVE EXAMPLE was formed not so as to receive a compression stress from fixing nozzles 30. That is, only one-axis tensile stress was applied to the member of COMPARATIVE EXAMPLE.

The strain aging process at 170° C. for 20 minutes in the atmospheric condition was given to all of the members of EXAMPLE 1, EXAMPLE 2 and COMPARATIVE EXAMPLE. Thereafter, the characteristics as to the static tensile strength and the dynamic tensile strength of all members were researched.

(1) Static Tensile Strength and Dynamic Tensile Strength

Figure 6:
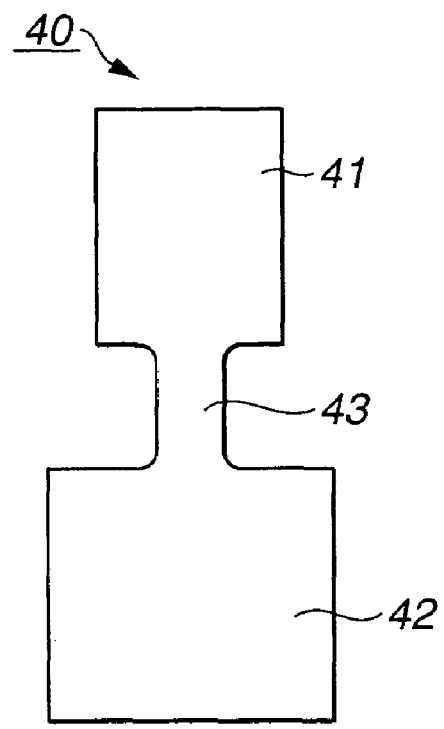
FIG. 6 is a view showing a tensile specimen for tensile test.

FIG. 6 shows a tensile specimen 40 for the tensile test. The tensile specimen 40 had gripping ends 41 and 42, and a parallel portion 43 located between the gripping ends 41 and 42. Tensile specimen 40 had a full length of 50 mm, and each gripping portion had a length of 20 mm. The upper-side gripping portion in FIG. 6 had a width of 15 mm, the lower-side gripping portion in FIG. 6 had a width of 24 mm, and the parallel portion had a width of 5 mm. Tensile specimens 40 of EXAMPLES 1 and 2 and COMPARATIVE EXAMPLE were obtained from the longitudinal wall faces 13 and 23 of the formed members such that a parallel portion 43 of each specimen 40 extends along the circumferential direction.

The static tensile test was executed using Instron tensile test machine under a condition of a strain rate of 0.001/sec. The dynamic tensile test was executed using One-Bar method high-speed tensile test machine under a condition of a strain rate of 1200/sec.

TABLES 2 and 3 show three-direction principal strains and an equivalent plastic strain as pre-strain information of tested specimens 40. As to a principal strain, a positive value denotes a tensile direction, and a negative value denotes a compressing direction. TABLES 2 and 3 further show a tensile strength and a maximum strength of each specimen as a tensile test result. A equivalent plastic train in TABLES 2 and 3 was evaluated by converting a magnitude of a combination strain into a one-axis tensile strain and was obtained from the following expression.

$$\varepsilon_{eq} = \sqrt{\frac{2}{3}} \sqrt{\varepsilon_1^2 + \varepsilon_2^2 + \varepsilon_3^2}$$

where a unit of the equivalent plastic strain is non-dimension, and $\varepsilon_1$, $\varepsilon_2$ and $\varepsilon_3$ are principal strains as to the respective direction.

TABLE 2

(Tensile test result under a strain rate of 0.001/s)

| | Guideline of $\epsilon_1:\epsilon_2$ | Direction of Tensile Test | Equivalent Plastic Strain (pre-strain) quantity | Principal Strain $\epsilon_1$ (circum.) | $\epsilon_2$ (long.) | $\epsilon_3$ (thick.) | TS/Mpa |
|---|---|---|---|---|---|---|---|
| EXAMPLE 1 | −1:0 | Circumferential Direction | 0.053 | −0.046 | 0 | 0.046 | 634 |
| | | | 0.083 | −0.072 | 0 | 0.072 | 674 |
| | | Longitudinal Direction | 0.056 | −0.049 | 0 | 0.049 | 698 |
| | | | 0.098 | −0.085 | 0 | 0.085 | 762 |
| EXAMPLE 2 | 4:−3 | Circumferential Direction | 0.043 | 0.041 | −0.031 | −0.010 | 630 |
| | | Longitudinal Direction | 0.043 | 0.041 | −0.031 | −0.010 | 615 |
| COMPARAITVE EXAMPLE | 2:−1 | Circumferential Direction | 0.000 | 0 | 0 | 0 | 562 |
| | | | 0.020 | 0.020 | −0.006 | −0.014 | 572 |
| | | | 0.049 | 0.049 | −0.024 | −0.025 | 601 |
| | | | 0.096 | 0.095 | −0.042 | −0.054 | 631 |
| | | Longitudinal Direction | 0.000 | 0 | 0 | 0 | 558 |
| | | | 0.021 | 0.020 | −0.003 | −0.017 | 578 |
| | | | 0.049 | 0.049 | −0.021 | −0.028 | 589 |
| | | | 0.096 | 0.095 | −0.039 | −0.057 | 620 |

Remarks: positive value denotes a tensile direction, and negative value denotes a compressing direction.

TABLE 3

(Tensile test result under a strain rate of 1200/s)

| | Guideline of $\epsilon_1:\epsilon_2$ | Direction of Tensile Strength | Equivalent Plastic Strain (pre-strain) quantity | Principal Strain $\epsilon_1$ (cir.) | $\epsilon_2$ (long.) | $\epsilon_3$ (thick.) | TS/Mpa |
|---|---|---|---|---|---|---|---|
| EXAMPLE 1 | −1:0 | Circumferential Direction | 0.056 | −0.049 | 0 | 0.049 | 795 |
| | | | 0.092 | −0.080 | 0 | 0.080 | 832 |
| | | Longitudinal Direction | 0.068 | −0.059 | 0 | 0.059 | 815 |
| | | | 0.110 | −0.095 | 0 | 0.095 | 876 |

TABLE 3-continued (Tensile test result under a strain rate of 1200/s)

| | Guideline of $\epsilon_1:\epsilon_2$ | Direction of Tensile Strength | Equivalent Plastic Strain (pre-strain) quantity | Principal Strain $\epsilon_1$ (cir.) | $\epsilon_2$ (long.) | $\epsilon_3$ (thick.) | TS/Mpa |
|---|---|---|---|---|---|---|---|
| COMPARATIVE EXAMPLE | 2:−1 | Circumferential Direction | 0.000 | 0 | 0 | 0 | 677 |
| | | | 0.020 | 0.020 | −0.009 | −0.011 | 692 |
| | | | 0.049 | 0.049 | −0.026 | −0.022 | 730 |
| | | | 0.096 | 0.095 | −0.038 | −0.057 | 725 |
| | | Longitudinal Direction | 0.000 | 0 | 0 | 0 | 672 |
| | | | 0.020 | 0.020 | −0.009 | −0.011 | 684 |
| | | | 0.049 | 0.049 | −0.021 | −0.028 | 703 |
| | | | 0.096 | 0.095 | −0.039 | −0.057 | 709 |

Remarks: positive value denotes a tensile direction, and negative value denotes a compressing direction.

Figure 8:
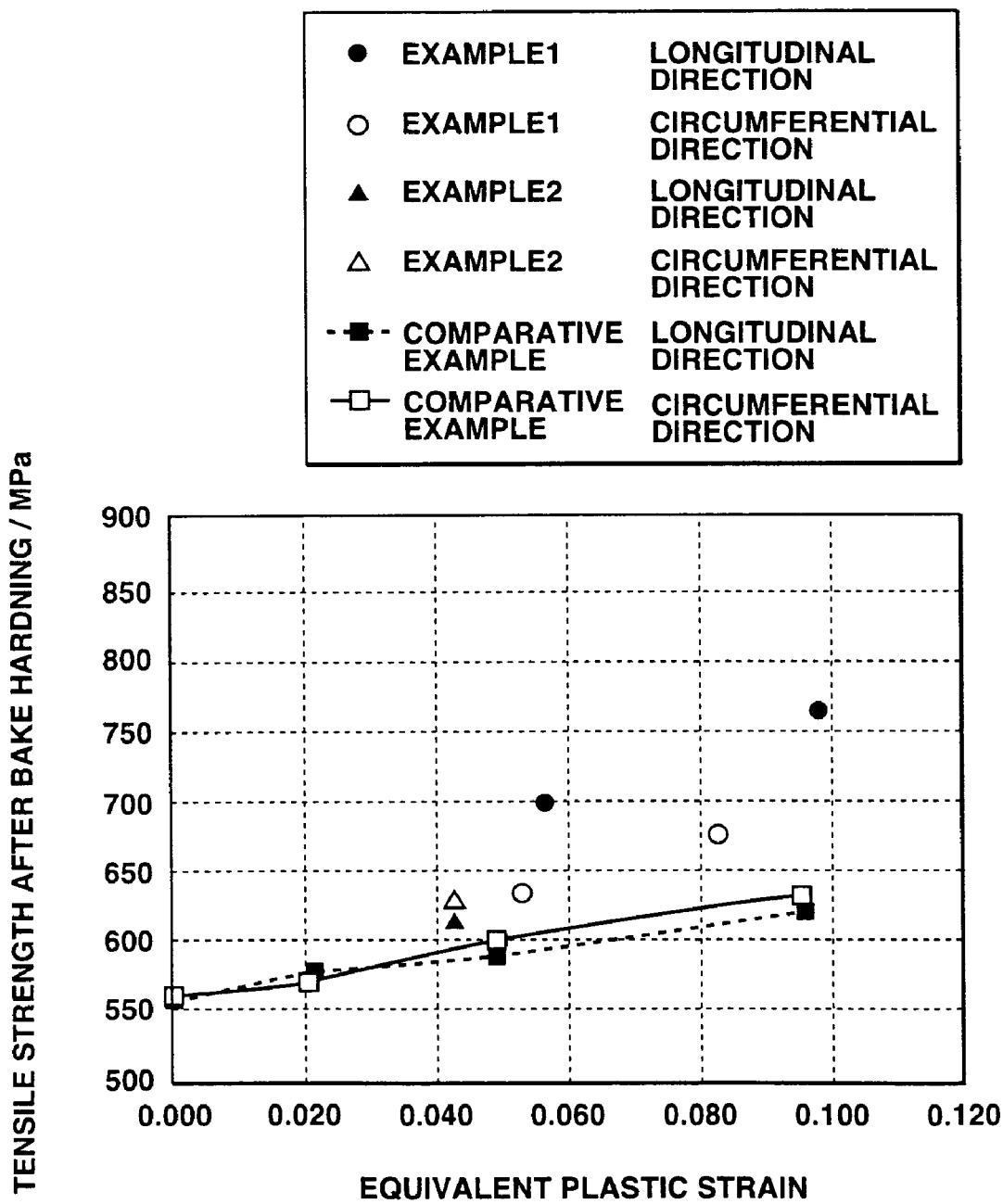
FIG. 8 is a graph showing a result of a static tensile test.
Figure 9:
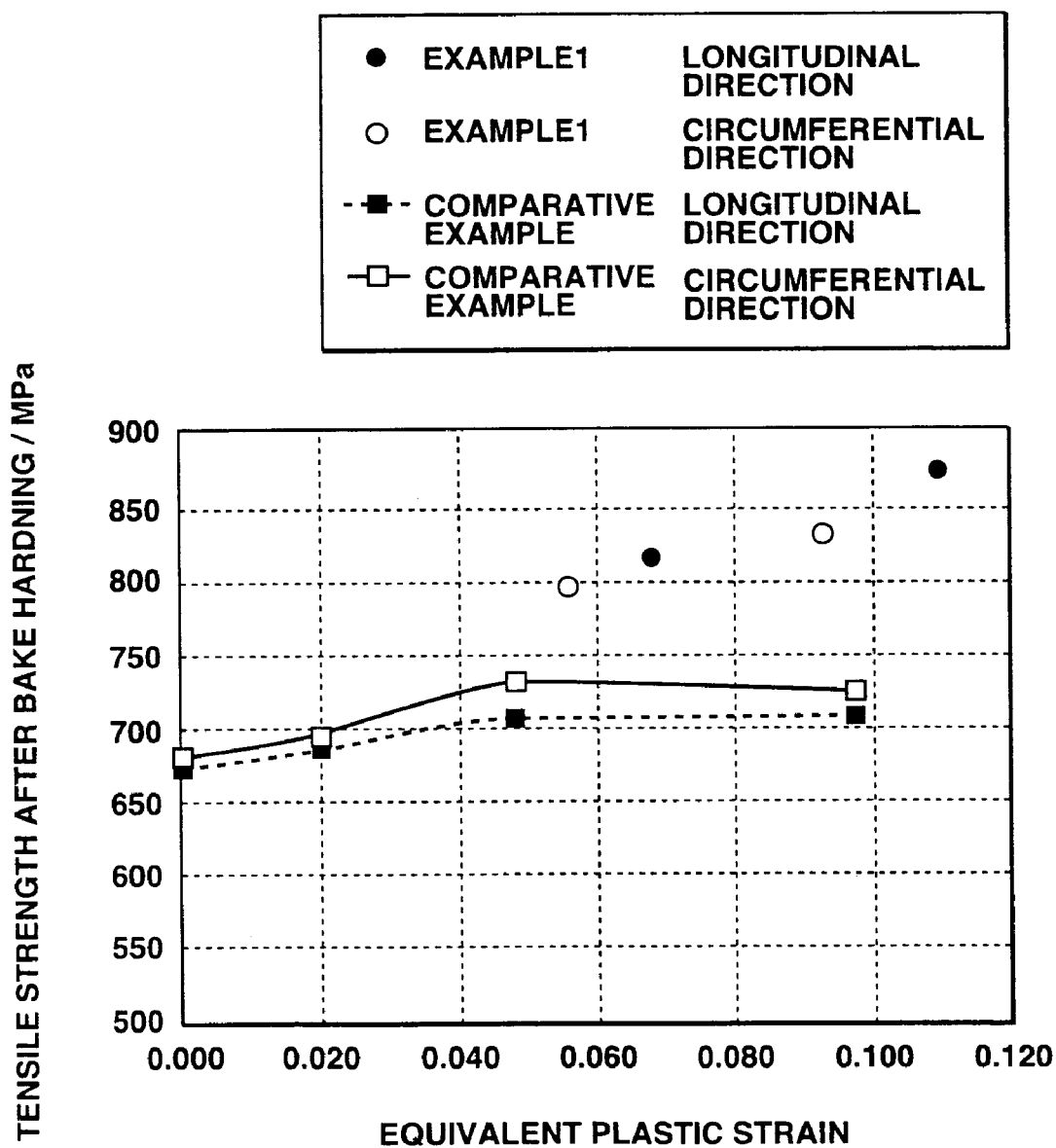
FIG. 9 is a graph showing a result of a dynamic tensile test.

FIG. 8 shows a result of the static tensile test, and FIG. 9 shows a result of the dynamic tensile test. FIGS. 8 and 9 show a relationship between a pre-strain (equivalent plastic strain) and a tensile strength (maximum strength). As clear from FIGS. 8 and 9, EXAMPLES 1 and 2 exhibited higher strength in both static mode and dynamic mode as compared with the result of COMPARATIVE EXAMPLE which employed a pre-strain of one axis tensile. This result proved the advantages of the present invention.

(2) Dynamic Bending Test

The dynamic bending test was executed in the following manner.

Both of a compressed-pipe forming member including a compression strain and a bend-forming member including no compression strain were prepared from a steel pipe having an outer diameter of 100 mm and a thickness of 1.8 mm.

The compressed-pipe forming member was formed into a square pipe by mean of hydro-forming so as to apply a compression strain of 8% along the circumferential direction of the longitudinal wall face. The produced square member has a cross-sectional size of 74 mm×81 mm, and a thickness of the longitudinal wall face of 1.95 mm. The bend-forming member was obtained by forming the above-mentioned steel pipe into a square pipe having a cross-sectional size of 80 mm×80 mm. The bend-forming member has a strain only at a bent portion, and there was no thickness change in the bend forming member.

Figure 7:
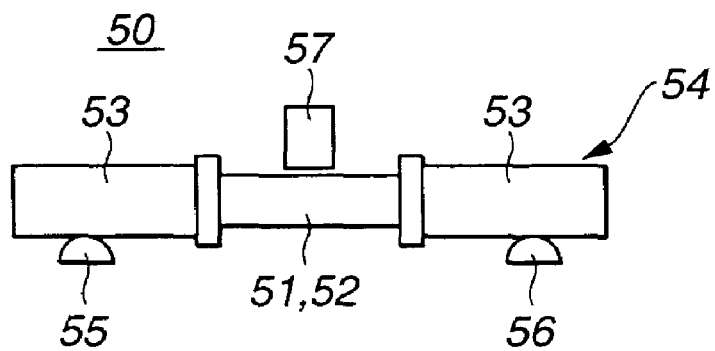
FIG. 7 is a view showing a three-point bending test.

FIG. 7 shows a three-point bending test machine 50. Test specimens 54 for this machine 50 were prepared by cutting out end portions of each of compressed-pipe forming member 51 and bend-forming member 52 and welding H-shape steel member 53 at both ends of each of members 51 and 52, respectively. Each specimen 54 had a total length of 900 mm, and a tested portion of each of members 51 and 52 in each specimen had a length of 300 mm. A span between two fulcrums 55 and 56 in the three-point bending test machine 50 was 700 mm. A heat treatment under the atmospheric condition at the temperature of 170° C. for 20 minutes was given to specimens 54 as the strain aging treatment.

Specimens 54 were tested by the three-point bending test in a manner of dropping a striker 57 having a weight of 500 kg and a width of 50 mm at a speed of 7.6 m/sec. and by measuring and comparing the energy absorptions of specimens 54.

Figure 10:
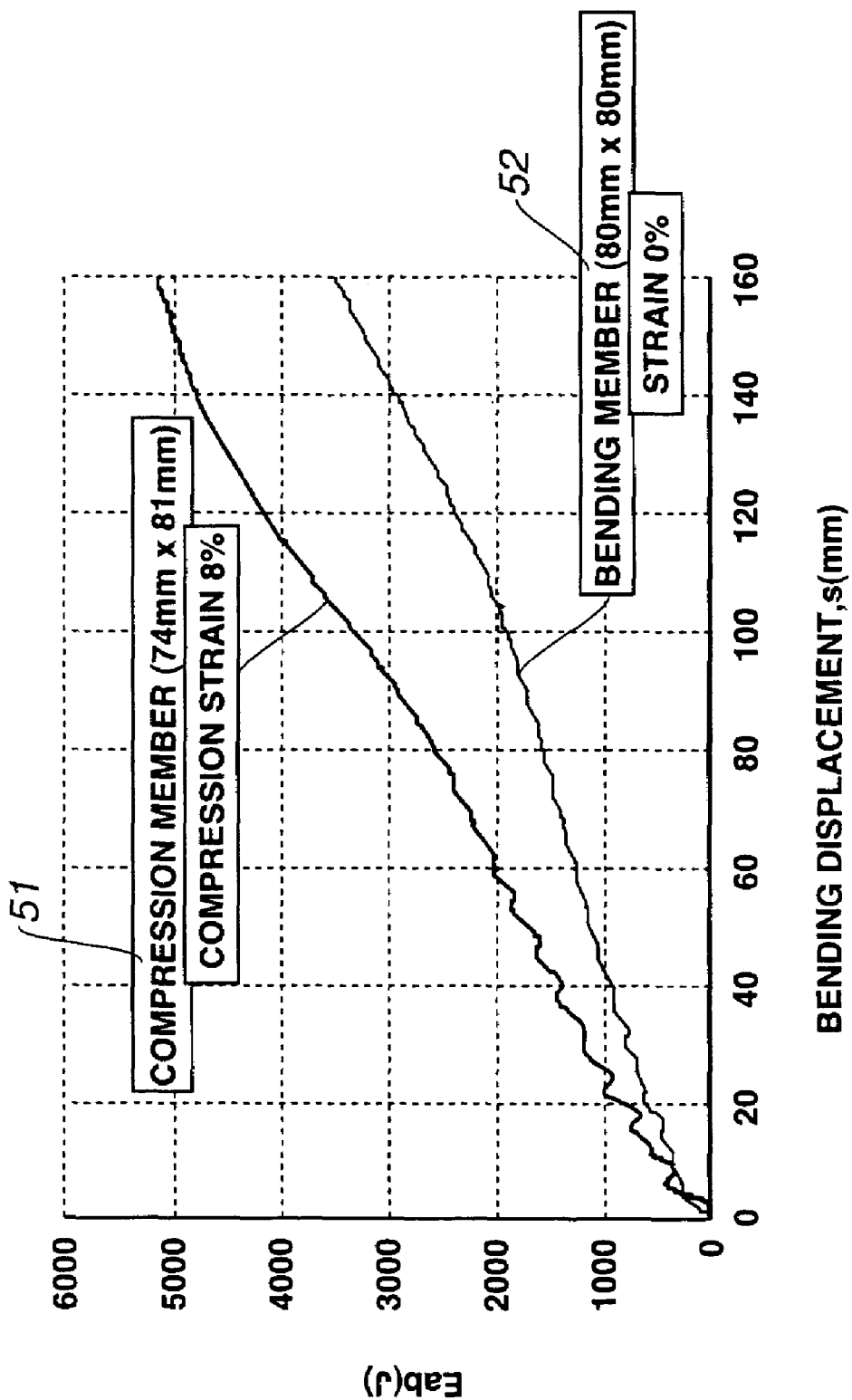
FIG. 10 is a graph showing a result of a dynamic bending test.

FIG. 10 shows the dynamic bending test result, particularly, the relationship between the bending displacement (striker displacement) and an energy absorption of each specimen. As is clear from FIG. 10, compressed-pipe forming member 51, which was prepared so as to include the compression strain due to the compression stress, attained an advantageous result such that the absorption energy value of compressed-pipe forming member 51 increased in every displacements by 50% as compared with that of the member 52. This clearly exhibited the advantage obtained by applying the compression strain to a member.

As discussed above, each of reinforced members 10 and 20 includes reinforced area P which was produced by forming the member while applying the compression strain and by giving the strain aging treatment on the formed member. Therefore, as compared with a member which was prepared by a conventional method of applying a small pre-strain to a member or a method of applying the strain aging hardening to a member after providing a pre-strain by applying the tensile stress to the member, the reinforced member according to the present invention attained a superior static strength, and particularly, a superior dynamic strength. This advantage is generally equivalent to a case of employing a high-strength steel, and therefore it becomes possible to obtain the advantages of easily attaining the strength improvement. Further, it becomes possible to provide a reinforced member having a high-strength, which is obtained by effectively utilizing a strength characteristic obtained after the compression deformation is applied to the steel member having a strain aging characteristic.

With the thus arranged reinforced member according to the present invention, it becomes possible to obtain a sufficient strength equivalent to a case that a high-strength steel is used as material of the member.

This application is based on Japanese Patent Applications No. 2003-313106 filed on Sep. 4, 2003 in Japan. The entire contents of these Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A reinforced member which is made from a steel product having a strain aging characteristic and a closed section when viewed in cross section perpendicular to an axis of the reinforced member, the reinforced member comprising:

a reinforced area produced by press-forming the steel product so as to generate a circumferential compression strain due to the application of a circumferential compression stress throughout a thickness of the steel product, and by giving a strain aging treatment to the press-formed steel product, wherein the reinforced area is produced under a press-forming condition in which the press-formed steel product further has a longitudinal elongation strain generated due to the application of a longitudinal elongation stress, wherein the circumferential compression strain is 2% or more and the longitudinal elongation strain is smaller than twice the value of the circumferential compression strain.

2. The reinforced member as claimed in claim 1, wherein the reinforced area includes at least a part of a surface of the steel product, and the compression strain exists in the reinforced area through the thickness of the steel product.

3. The reinforced member as claimed in claim 1, wherein the closed section including the reinforced area has one of a circular shape and a rectangular shape.

4. The reinforced member as claimed in claim 1, wherein the compression strain is generated by applying the compression stress in the direction of decreasing the circumferential length of the closed section.

5. The reinforced member as claimed in claim 1, wherein the reinforced area includes a high stress load portion.

6. The reinforced member as claimed in claim 5, wherein the circumferential length of the closed section at the high stress load portion is shorter than the circumferential length of the closed section at any portion other than the high stress load portion.

7. The reinforced member as claimed in claim 1, wherein the compression strain is applied by one of hydro-forming, spinning, swaging and rolling.

8. The reinforced member as claimed in claim 1, wherein the closed section has a rectangular shape and the compression strain is applied to the whole area of at least two faces of the rectangular shape closed section by hydro-forming.

9. The reinforced member as claimed in claim 1, wherein the reinforced member is configured to construct a vehicle structural member.

10. The reinforced member as claimed in claim 9, wherein the vehicle structural member comprises a member, a roof rail, a pillar or a sill.

11. The reinforced member as claimed in claim 1, wherein the steel product comprises a steel sheet or a steel pipe.

12. The reinforced member as claimed in claim 1, wherein the closed section is a hollow or tubular structure.

13. The reinforced member as claimed in claim 1, wherein the circumferential compression strain is formed by the application of a circumferential compression stress through the thickness of the steel product and a longitudinal compression strain due to the application of a longitudinal compression stress applied to ends of the steel product.

14. A reinforced member, comprising:
a steel product comprising a reinforced area,
wherein the steel product is hollow or tubular in cross section perpendicular to an axis of the reinforced member,
wherein the reinforced area is produced by press-forming the steel product to create a circumferential compression strain due to the application of a circumferential compression stress through a thickness of the steel product and a longitudinal elongation strain generated due to the application of a longitudinal elongation stress, wherein the circumferential compression strain is 2% or more and the longitudinal elongation strain is smaller than twice the value of the circumferential compression strain, and
wherein the reinforced area is further produced by a strain aging treatment to the press-formed steel product.

15. A method of producing a reinforced member made from a steel product having a strain aging characteristic and has a closed section at a cross section perpendicular to an axis of the reinforced member, the method comprising:
producing a reinforced area by press-forming the steel product so as to generate a circumferential compression strain in the press-formed steel product due to the application of a circumferential compression stress throughout a thickness of the steel product;
wherein the reinforced area is produced under a press-forming condition in which the press-formed steel product further has a longitudinal elongation strain generated due to the application of a longitudinal elongation stress, wherein the circumferential compression strain is 2% or more and the longitudinal elongation strain is smaller than twice the value of the circumferential compression strain; and
giving a strain aging treatment to the press-formed steel product.

* * * * *